United States Patent [19]

Sakai et al.

[11] Patent Number: 4,961,122
[45] Date of Patent: Oct. 2, 1990

[54] HYDRODYNAMIC GROOVED BEARING DEVICE

[75] Inventors: Kazuo Sakai, Ibaraki; Takao Terayama, Ushiku; Juichi Morikawa, Katsuta, all of Japan

[73] Assignee: Hitachi, Ltd., Tokyo, Japan

[21] Appl. No.: 46,563

[22] Filed: May 6, 1987

[51] Int. Cl.$^5$ .............................................. G11B 5/008
[52] U.S. Cl. .............................. 360/107; 360/130.24; 384/114; 384/292; 384/397
[58] Field of Search ...... 360/107, 108, 130.22–130.24, 360/84–85; 384/99–100, 108, 115, 118, 120, 283, 291, 292, 378, 397, 107, 114

[56] References Cited

U.S. PATENT DOCUMENTS

| | | | |
|---|---|---|---|
| 1,122,565 | 12/1914 | Bache | 384/283 |
| 3,957,317 | 5/1975 | Silver | 384/397 |
| 4,371,216 | 2/1983 | Suzuki et al. | 384/118 |
| 4,706,144 | 11/1987 | Asada et al. | 360/107 |

FOREIGN PATENT DOCUMENTS

| | | |
|---|---|---|
| 0538717 | 7/1959 | Belgium . |
| 2100365 | 9/1981 | Fed. Rep. of Germany . |
| 0710898 | 8/1931 | France . |

OTHER PUBLICATIONS

Drescher, "Stepped–Clearance Plain Thrust Bearings," Konstruktion, vol. 9, 1965, pp. 341–349.
Bootsma, "Liquid–Lubricated Spira-Groove Bearings", Philips Research Reports, 1975, No. 7, pp. 89–91 and 102–104.

Primary Examiner—David J. Severin
Attorney, Agent, or Firm—Antonelli, Terry, Stout & Kraus

[57] ABSTRACT

A hydrodynamic grooved bearing device in which a shaft is inserted into a hole formed in a bearing housing and one of the shaft and bearing housing is rotated, thereby the rotated member being supported includes a plurality of grooves formed on the shaft or an inner peripheral surface of the bearing housing for generating a dynamic pressure of fluid filled between the shaft and the bearing housing. The plurality of grooves are arranged side by side with a substantially certain pitch in a direction of rotation. Each of the grooves comprises a pair of groove portions slanted relative to the direction of rotation such that a distance between the pair of groove portions becomes narrower towards the direction of rotation and a connecting groove portion connecting the narrowest distance between the slanted groove portions. The connecting groove portion is extended in a direction substantially perpendicular to the direction of rotation. The provision of the dynamic pressure generating grooves enables a high bearing load and a stable bearing performance with a minimum degree of whirling compared with conventional V-grooved bearing.

30 Claims, 9 Drawing Sheets

HYDRODYNAMIC GROOVED BEARING DEVICE

BACKGROUND OF THE INVENTION

This invention relates to a dynamic pressure fluid bearing device.

A herringbone-grooved bearing having grooves called herringbones which are formed in a fluid bearing portion is known as an example of a dynamic pressure fluid bearing device. An example of the shape of the fluid bearing in this type of fluid bearing device is disclosed on pages 28 to 91 and 102 to 104 of "PHILIPS RESEARCH REPORTS" No. 7, 1975. In a herringbone-grooved bearing, fluid collects inside the bearing along grooves "V" or "\ /" shaped grooves so as to generate a dynamic pressure, thereby supporting a rotary member. A bearing which has grooves formed in its bearing portion enables a large bearing load and stable bearing performance compared with a bearing which has no grooves in its bearing portion.

However, it is expected that this type of conventional dynamic pressure fluid bearing device can be improved with respect to the points described below.

First, in the bearing device which has grooves in the form of a "V" (hereinafter referred to as "V grooves", dynamic pressure is generated by the collection of fluid which is supplied between opposed surfaces of rotary and stationary members at the center of each V along the V grooves, so that this type of bearing enables an allowable bearing load which is higher than that of a bearing having no grooves, but is considerably smaller than that of a bearing with grooves in the form of "\ /" (hereinafter referred to as "partial grooves").

A bearing having partial grooves enables a bearing load which is larger than that of a bearing having V grooves. However, this type of bearing is not sufficiently capable of retaining the lubricating fluid. When the relative rotational speed between the shaft and the bearing portion is reduced, a contact area of the opposed surfaces of the shaft and the bearing portions increases. Therefore, the lubricating fluid does not sufficiently enter between the opposed surfaces. This raises a risk of burning the bearing surface because of a contact between the shaft and the bearing portion, or of the generation of vibration or abnormal noise. When starting or stopping, it is particularly difficult for the lubricating fluid to enter between the shaft and the bearing portion, and problems such as the above tend to occur. These problems are not negligible when a dynamic pressure fluid bearing device of the partial groove type is applied to a specific use in which it starts and stops frequently, for example, as a rotary head mechanism in a video tape recorder.

SUMMARY OF THE INVENTION

It is therefore an object of the present invention to provide a dynamic pressure fluid bearing device which enables a large bearing load with a stable bearing performance.

It is another object of the present invention to provide a highly reliable dynamic pressure fluid bearing device which can provide a stable bearing performance even during starting or stopping.

It is still another object of the present invention to provide a dynamic pressure fluid bearing device which is designed so as to facilitate the machining for forming grooves which generate dynamic pressure.

Therefore, the present invention provides in one aspect a dynamic pressure fluid bearing device in which dynamic pressure generating grooves are formed on one of a rotary member and a stationary member facing the rotary member, fluid is provided between opposed surfaces of the rotary and stationary members, and dynamic pressure of the fluid is generated by a rotation of the rotary member, thereby the rotary member being supported, wherein each of the dynamic pressure generating grooves comprises a pair of boosting groove portions oppositely slanted relative to the direction of rotation of the rotary member, the remotest ends of the pair of boosting groove portions being directed forward and the nearest ends of the boosting groove portions being directed rearward relative to the direction of rotation; and an accumulating groove portion connecting the nearest ends of the boosting grooves.

Another aspect of the present invention involves a dynamic pressure fluid bearing device including a shaft member, a housing member into which the shaft member is fitted, a fluid which includes grease provided between a surface of the shaft member and a receiving surface of the housing member facing each other, dynamic pressure generating grooves formed on one of the surfaces of the shaft member and the housing member, whereby dynamic pressure of the fluid is generated by relative rotation of the shaft member and the housing member, thereby a rotating member of them being supported, wherein each of the dynamic pressure generating grooves comprises a pair of slanted groove portions oppositely slanted relative to a direction of the relative rotational movement between the shaft member and the housing member, the remotest ends of the pair of slanted groove portions being directed toward the direction of rotation and the nearest ends of the slanted groove portions being directed rearward in the direction of rotation and a groove portion connecting the nearest ends of the slanted groove portions in a direction substantially perpendicular to the direction of the relative rotational movement.

Other objects and features of the present invention will be clear upon reading the following description.

DETAILED DESCRIPTION OF THE PREFERRED EMBODIMENTS

Figure 1:
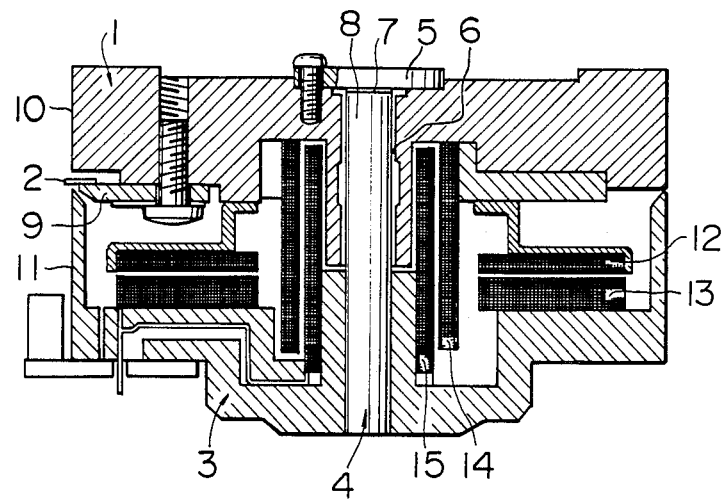
FIG. 1 is a cross-sectional view of a V.T.R. head including an embodiment of the present invention.

The rotary recording mechanism shown in FIG. 1 includes a rotary cylinder 1, a head 2 (normally, two or more heads are provided) which is disposed at the outer periphery of the rotary cylinder 1 and which is used to record a signal on a tape (not shown) or reproduce a signal recorded on the tape, a fixed cylinder 3, a shaft 4 extending from the fixed cylinder 3 and fitting into the rotary cylinder 1, a motor (constituted by a stator 13 and a rotor 12) which generates rotary drive force, and a non-contact type signal transmitting portion (corresponding to a stator 15 and a rotor 14) for transmitting or receiving a signal between the head 2 and a signal processing unit (not shown). One end of the shaft 4 is fixed to a hole formed at the center of the fixed cylinder 3 by press-fitting, shrinkage fitting, or a similar method. The other end of the shaft 4 is inserted into a hole formed in a bearing housing 6 provided as a bearing portion at the center of the rotary cylinder 1 with an extremely small gap between the shaft 4 and the housing 6. The rotary cylinder 1 thus constituted is rotatable about the shaft 4, and a radial bearing is formed between the cylinder 1 and the shaft 4. A thrust bearing plate 5 which forms a thrust bearing between itself and an end surface 7 of the shaft 4 is attached to one end of the bearing housing 6 (the top end as viewed in FIG. 1) by means of screws. The position of the rotary cylinder is thereby restricted in the vertical direction. The head 2 is attached to the rotary cylinder 1 by a head base 9 and is disposed so as to slightly project from an outer peripheral surface 10 of the rotary cylinder 1. The rotary cylinder 1 is also provided with a rotary-side transmission and reception coil 14 which transmits a signal read by the head 2 to the stationary members or transmits a signal supplied from the stationary members to the head 2. The fixed cylinder 3 has a stationary-side transmission and reception coil 15 which faces the coil 14. The rotor 12 and the stator 13 constituting the motor are disposed on the rotary cylinder 1 and the fixed cylinder, respectively, so as to face each other.

The assembly shown in FIG. 1 has the function of recording a signal onto magnetic tape (not shown), which is helically wound around the outer peripheral surface 10 of the rotary cylinder 1 and an outer peripheral surface 11 of the fixed cylinder 3, or reproducing a signal recorded on the magnetic tape by using the head 2 and making the motor (12, 13) rotate the rotary cylinder 1. During the recording effected by the head 2, the width of tracks on the magnetic tape is set to be extremely small (normally, several tens of $\mu$m) in order to enable recording at a high density. It is therefore necessary to minimize the degree of whirling of the rotary cylinder 1. Experiments have shown that, for good recording or reproduction, it is normally necessary for the rotary cylinder to be controlled by limiting the degree of whirling thereof to at most 10 $\mu$m.

Figure 2:
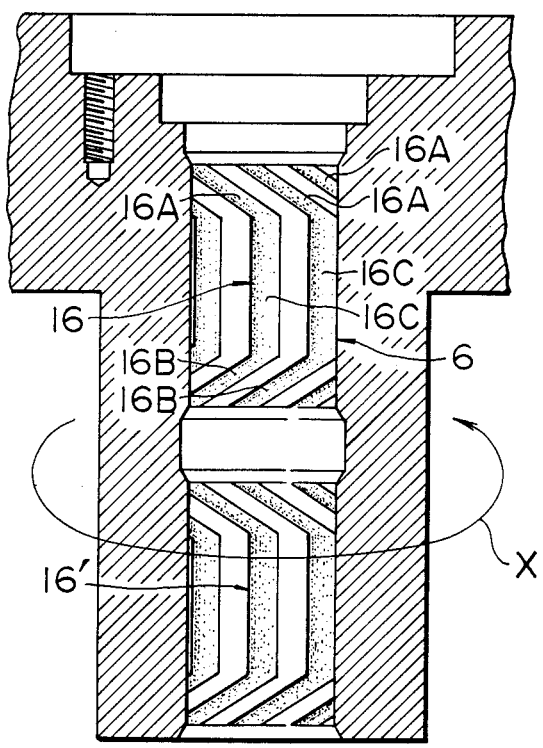
FIG. 2 is an enlarged diagram of a bearing housing portion of the embodiment shown in FIG. 1.

To minimize whirling of the rotary member to a small degree, it is effective to provide a bearing force which is sufficiently larger than the weight of the rotary member and the unbalanced weight. In the assembly shown in FIG. 1, a plurality of grooves 16 and 16' for generating dynamic pressure are formed on the inner peripheral surface of the bearing housing 6 and two groups of the grooves are arranged along a rotational axis. FIG. 2 shows a detail of this portion of the bearing housing 6. Each of the grooves constituting the group of grooves 16 (or 16') is formed of two groove portions 16A and 16B, and a groove portion 16C. The groove portions 16A and 16B are slanted upward and downward relative to the direction of movement of the bearing housing 6 (as indicated by the arrow X in the drawing), that is, so that their outer ends are directed forward and their inner ends are directed rearward relative to the direction of movement (forward direction) of the housing, and the groove portion 16C is parallel to the axis of the shaft 4 and connects the inner ends of the groove portions 16A and 16B. A plurality of grooves, each constituting of the groove portions 16A, 16B and 16C, are arranged on the inner surface of the housing 6, thus forming groups of grooves 16 (or 16'). If dynamic pressure generating grooves shown in FIG. 2 are provided, dynamic pressure can be generated from the rotary motion of the bearing housing 6 following the rotation of the rotary cylinder 1, by making fluid which exists between the shaft 4 and the inner peripheral surface of the housing 6 flow along the groove portions 16A and 16B. (The fluid is air in this example, but other gases, or liquids such as lubricating oil, grease can be used also.) At the same time, a quantity of fluid that flows into the groove can be retained therein by the effect of the groove portion 16C. That is, the group of grooves has a boosting function which increases the bearing load by the effect of the slanted groove portions 16A and 16B and an accumulating function which retains the boosted bearing load by the effect of the groove portions 16C, thereby realizing an increased bearing load. The provision of these "\_/" shaped grooves enables a higher allowable bearing load than that of a conventional type of bearing of V grooves. As a result, whirling of the rotary cylinder 1 is reduced to a very small degree, which greatly contributes to the achievement of good recording and reproduction. The bearing in which the grooves shown in FIG. 2 are formed has a reduced contact area between the shaft and the inner peripheral surface of the bearing housing and an extremely high performance of retaining fluid, so that no problem is caused by the contact between the shaft and the inner peripheral surface of the bearing housing, which might otherwise occur when the rotational speed in reduced.

The present invention has been described above with respect to the embodiment shown in FIGS. 1 and 2 in which the grooves 16 and 16' for generating dynamic pressure are formed on the inner peripheral surface of the bearing housing 6, but it should be noted that the present invention is not limited to this arrangement. It goes without saying that it is also possible to have an arrangement in which grooves for generating dynamic pressure are formed in the shaft. In such case, the groove portions 16A and 16B, namely, the boosting groove portions of the dynamic pressure generating groove converge relative to the rotating direction of the housing member 6. Further in the embodiment, the shaft is provided as a stationary member and the bearing portion is a rotary member, but the present invention is not limited to this and it is, as a matter of course, possible to provide a shaft as a rotary member and a bearing portion as a stationary member. In the latter case, grooves for generating dynamic pressure may also be formed either on the surface of the shaft or on the bearing surface. These alterations should be considered to be within the scope of the present invention.

Figure 3:
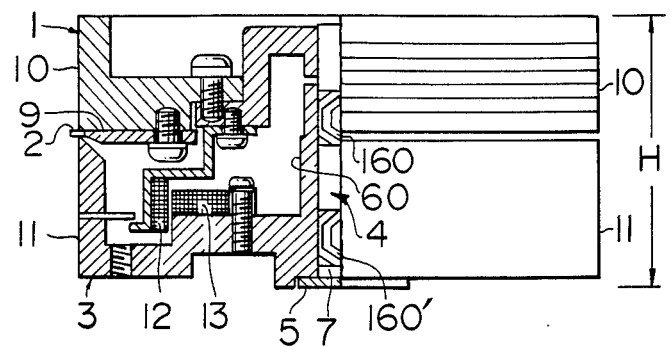
FIG. 3 is a half cross-sectional view of a V.T.R. head including another embodiment of the present invention.
Figure 4:
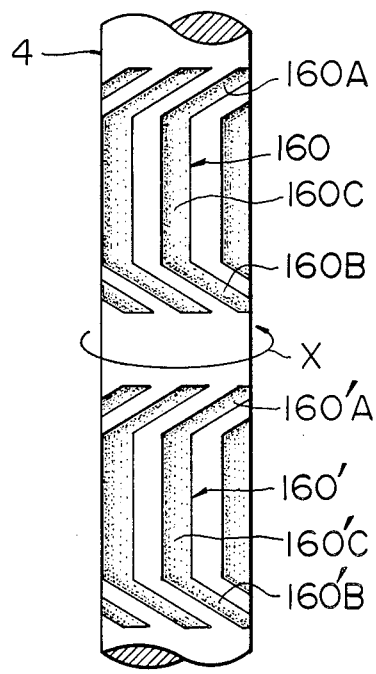
FIG. 4 is an enlarged diagram of a bearing portion of the embodiment shown in FIG. 3.

FIG. 3 shows the entire construction of an assembly which includes another embodiment of the present invention, and FIG. 4 is a fragmentary enlarged view of the shaft used in the embodiment of FIG. 3 As shown in FIG. 3, a rotary cylinder 1 has a shaft 4 disposed at its center so that the shaft 4 rotates together with the rotary cylinder 1. A fixed cylinder 3 has a bearing housing 60 at its center, and the shaft 4 is inserted into a hole formed in the bearing housing 60, a certain gap being left therebetween so as to make the shaft 4 rotatable. This embodiment is the same as that described above with reference to FIG. 1 insofar as a head 2 is mounted in the rotary cylinder 1 by a head base 9, a rotor 12 and a stator 13 constitute a motor, a magnetic tape (not shown) is helically wound around outer peripheral surfaces 10 and 11, and a signal is recorded in or reproduced from the magnetic tape through the head 2. In FIG. 3, the non-contact signal transmission unit is omitted.

Groups of grooves 160 and 160' for generating dynamic pressure are formed on the shaft 4 vertically which is shown in FIG. 3. As shown in FIG. 4, they are formed of a plurality of grooves which are arranged side by side in the direction of rotation X at substantially equal intervals. Each groove has a pair of boosting groove portions constituted by two slanted groove portions 160A and 160B (160A' and 160B'), and an accumulating groove portion 160C (160C') which connects the inner ends of the slanted groove portions. Fluid which exists or being supplied from the outside into the gap between the shaft 4 and the housing 60 by the effect of the rotation of the shaft 4 or the rotation of the rotary cylinder 1 is made to flow along the boosting groove portions 160A and 160B for generating dynamic pressure, thereby being pressurized. The fluid thereby pressurized is retained in the accumulating groove portion 160C. It is thereby possible to limit the degree of whirling of the rotary cylinder 1. The fluid used in this embodiment is air, and it is also possible to use other gases or liquids such as lubricating oil or grease instead of air.

Figure 5:
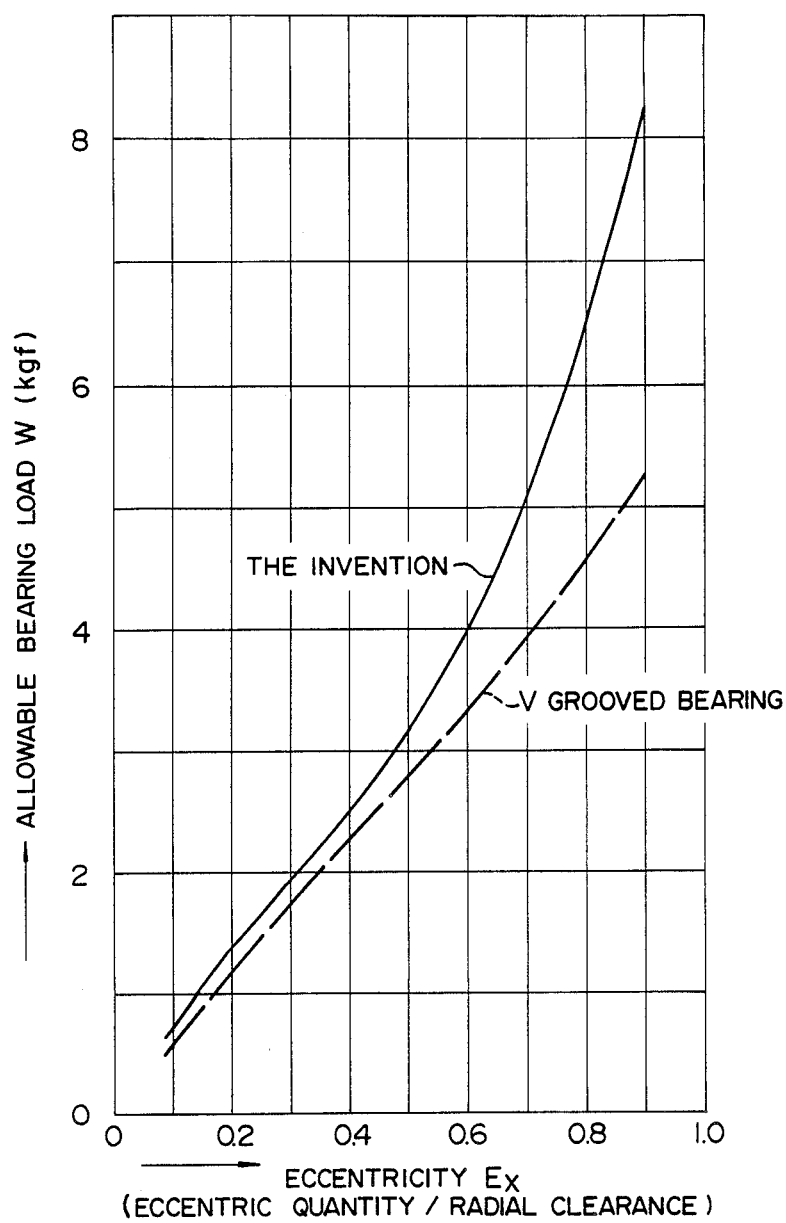
FIG. 5 is a graph showing a comparison between performances of the bearing in accordance with one of the embodiments of the present invention and a conventional V-groove bearing.

Results of comparison between a dynamic pressure bearing device having grooves in the above-described shape in accordance with the embodiments of the present invention and a dynamic pressure bearing device having conventional V grooves with respect to the allowable bearing load W thereof will be described below with reference to FIG. 5. In the graph shown in FIG. 5, the ordinate represents an allowable bearing load W, and the abscissa represents an eccentricity $E_x$ between the shaft and the bearing housing. The relationship between these factors is shown after being analyzed on the basis of the finite element method. FIG. 5 compares the characteristics of these bearings under the same condition with respect to, for instance, the size of the shaft in which each type of groove is formed. Typical values of parameters used in the calculations to obtain the results shown in FIG. 5 are shown in Table 1.

TABLE 1

|  | Bearing in accordance with the present invention | Bearing with V grooves |
| --- | --- | --- |
| Groove angle | 30° | 30° |
| Width ratio of groove to land | 1:1 | 1:1 |
| Groove width | 8 μm | 8 μm |
| Bearing width 2l$_2$ | 8 mm | 8 mm |
| Bearing gap | 8 μm | 8 μm |
| Shaft diameter | 5 mm | 5 mm |
| Lubricating fluid viscosity | 0.004 kgf · s/mm$^2$ | 0.004 kgf · s/mm$^2$ |
| Rotational speed | 1800 rpm | 1800 rpm |

As is clear from FIG. 5, the larger the eccentricity $E_x$, the greater the allowable bearing load W of each bearing. The value of W of the bearing having the grooves in accordance with the present invention is larger than that of the bearing having the conventional V-grooves. This is highly advantageous in terms of the reduction in the degree of whirling as described above.

Figure 6:
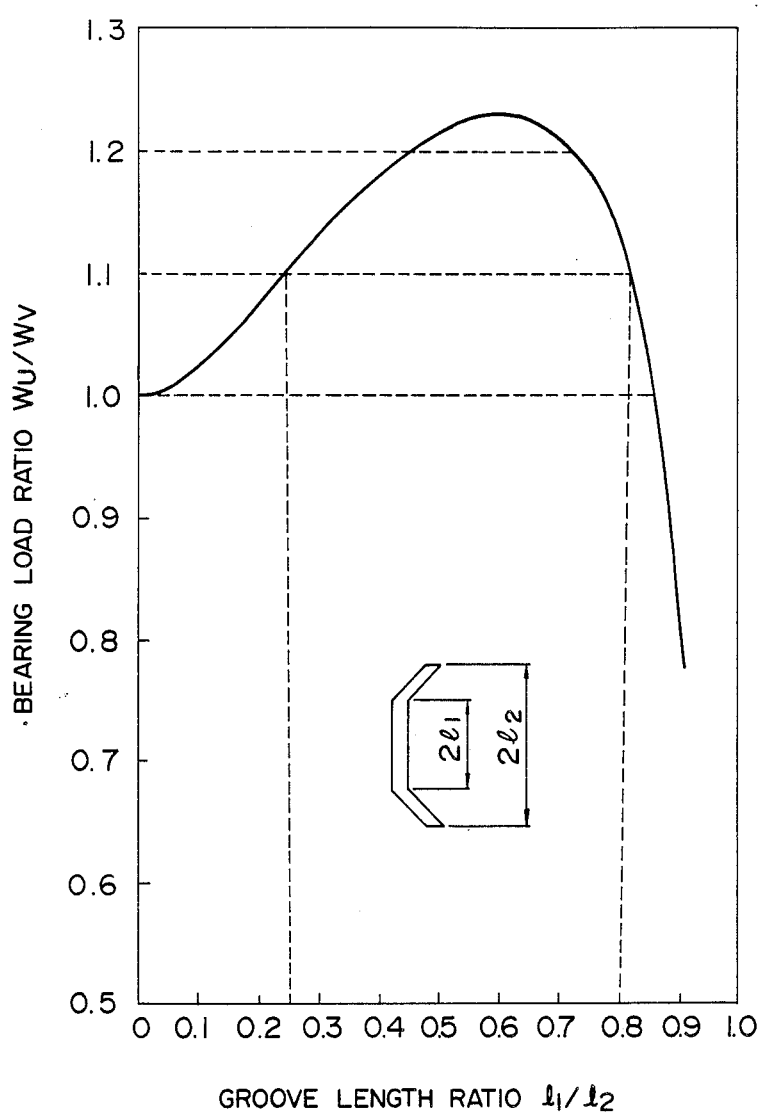
FIG. 6 is a graph showing a change in the performance of a bearing in accordance with one of the embodiments of the present invention due to a change of the shape of each dynamic pressure generating groove provided therein.

FIG. 6 shows a graph in which the abscissa represents the ratio of the length (2l$_1$) of the connecting groove portion, namely, accumulating groove portion 16C to the maximum distance (2l$_2$) between the boosting groove portions 16A and 16B in the axial direction (in this description, this is called a groove length ratio) and the ordinate represents the ratio of the allowable bearing load $W_u$ of the bearing in accordance with the present invention to the allowable bearing load $W_v$ of the V-groove bearing (this ratio is called a bearing load ratio) in relation to the groove length ratio ($l_1/l_2$). When the groove length ratio $l_1/l_2=0$, the shape of the groove in accordance with the present invention corresponds to that of the V-groove, and the bearing load ratio $W_u/W_v=1.0$. As shown in the graph, the bearing load ratio $W_u/W_v$ abruptly increases when the groove length ratio $l_1/l_2$ exceeds 0.1, and it is more than 1.1 (that is, more than 110% of the allowable bearing load $W_v$ of the V-groove bearing) when the groove length ratio is within a range from 0.2 to 0.3. It shows a point of inflection at a value of $l_1/l_2=0$ and a maximum value of about 1.23 about a value of $l_1/l_2=0.6$. That is, the allowable bearing load $W_u$ becomes a maximum value with an increment of about 23% of $W_v$ of the V-groove bearing when the groove length ratio $l_1/l_2$ is about 0.6. As $l_1/l_2$ exceeds a value of about 0.81, $W_u/W_v$ becomes smaller than a value of 1.1 and abruptly decreases. This is considered to be caused by the reduction in the effect of the boosting groove portions 16A and 16B. It is possible to enable an increment of at least 10% of the allowable bearing load W by setting the value of the groove length ratio $l_1/l_2$ to be in a range as represented by $$0.25 \leq l_1/l_2 \leq 0.81$$

from the results shown in FIG. 6. Accordingly it is preferable to set the value of $l_1/l_2$ to be $0.25 \leq l_1/l_2 \leq 0.81$, and more preferably $0.3 \leq l_1/l_2 \leq 0.8$. If the range of the value of $l_1/l_2$ is selected to be from 0.4 to 0.7, it is expected that it is possible to increase the allowable bearing load by about 20% thereof.

Figure 7:
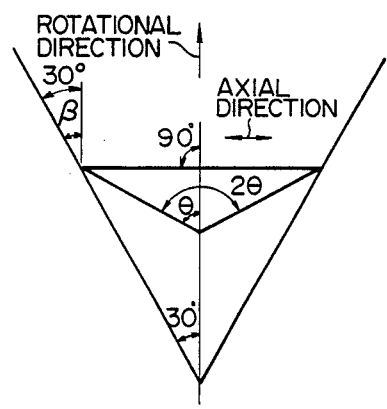
FIGS. 7 to 9 are diagrams showing a change of the performance of the bearing in accordance with the present invention due to a change of the shape of each dynamic pressure generating groove provided therein in relation to a conventional V-groove.
Figure 8:
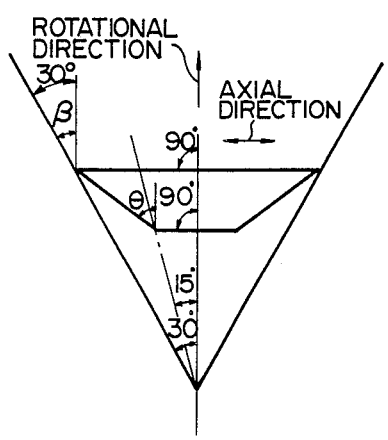
Figure 9:
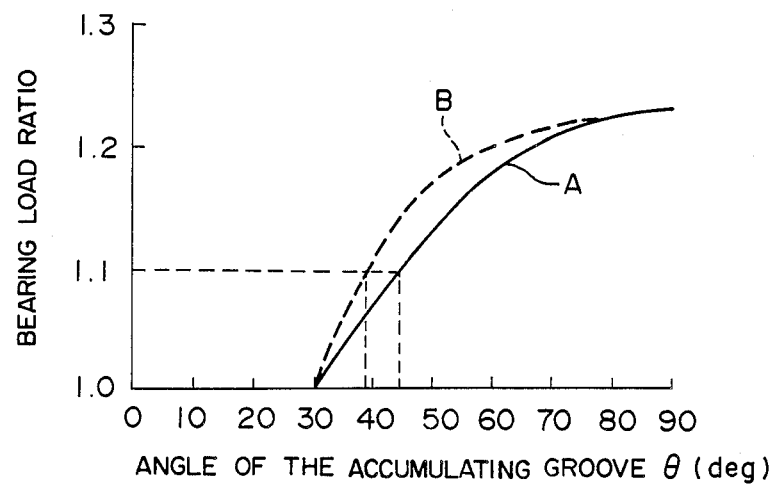

FIG. 9 shows a graph in which the solid line A indicates the bearing load ratio when an angle $2\theta$ of the accumulating groove portion 16C at a center thereof is changed as illustrated in FIG. 7. When $\theta = 30°$, the shape of the groove corresponds to that of the V groove. As is understood from FIG. 9, it is possible to obtain an allowable bearing load which is higher than that of the V groove by about 10% thereof when $\theta = 45°$. It is understood that, as $\theta$ increases, the allowable bearing load accordingly increases until the groove portion 16C becomes parallel to the axial direction. It is possible to think that the shape of the dynamic pressure generating grooves in the embodiments shown in FIGS. 1 to 4 is optimum. Another experiment has been made in which the angle of the accumulating groove portion 16C is changed to have two slanted sections as shown in FIG. 8. The relationship between an angle of inclination $\theta$ and the bearing load ratio is as indicated by the broken line B in FIG. 9. As shown in FIG. 8, $\theta$ is obtained by subtracting 90° from the angle at the point of intersection of a section of the groove portion 16C parallel to the axial direction and the slanted section, and $\theta$ is increased in such a manner that this point of intersection moves on a line which has an inclination of 15° relative to the direction of rotation of the shaft. As indicated by the broken line in FIG. 9 which shows the results of this experiment, the allowable bearing load increases as $\theta$ increases. It shows a maximum value when $\theta = 90°$ (when the groove portion 16C is straight and parallel to the axial direction). In accordance with the broken line B, the allowable bearing load is higher than that of the V groove by about 10% thereof when $\theta = 39°$.

Figure 10:
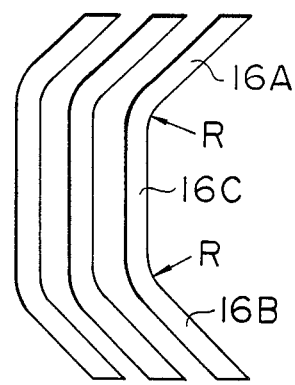
FIGS. 10 and 11 are diagrams of examples of the dynamic pressure generating groove.
Figure 11:
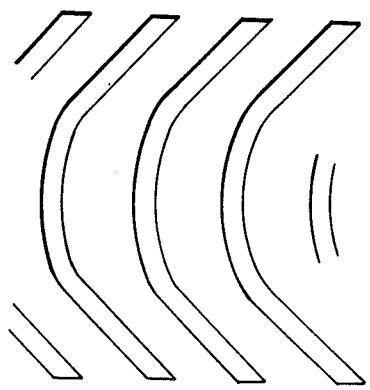

The shape of the dynamic pressure generating groove in accordance with the present invention is not limited to the above-described types For example, as shown in FIGS. 10 and 11, the groove may be formed in such a manner that it has a round portions formed at connections between the two slanted portions 16A and 16B and the central connecting groove portion 16C or that one or more of the groove portions 16A to 16C is slightly curved. The provision of such round portions improves the workability of the grooves at the time of machining thereof as well as the accuracy in the working. Even when the shape of the entire part of each groove is semi-circular, elliptical or otherwise curved, it is possible to obtain an allowable bearing load larger than that of the V-groove bearing by arranging in such a manner that an inner portion of the groove has a larger angle of inclination than that of an outer portion.

Figure 12:
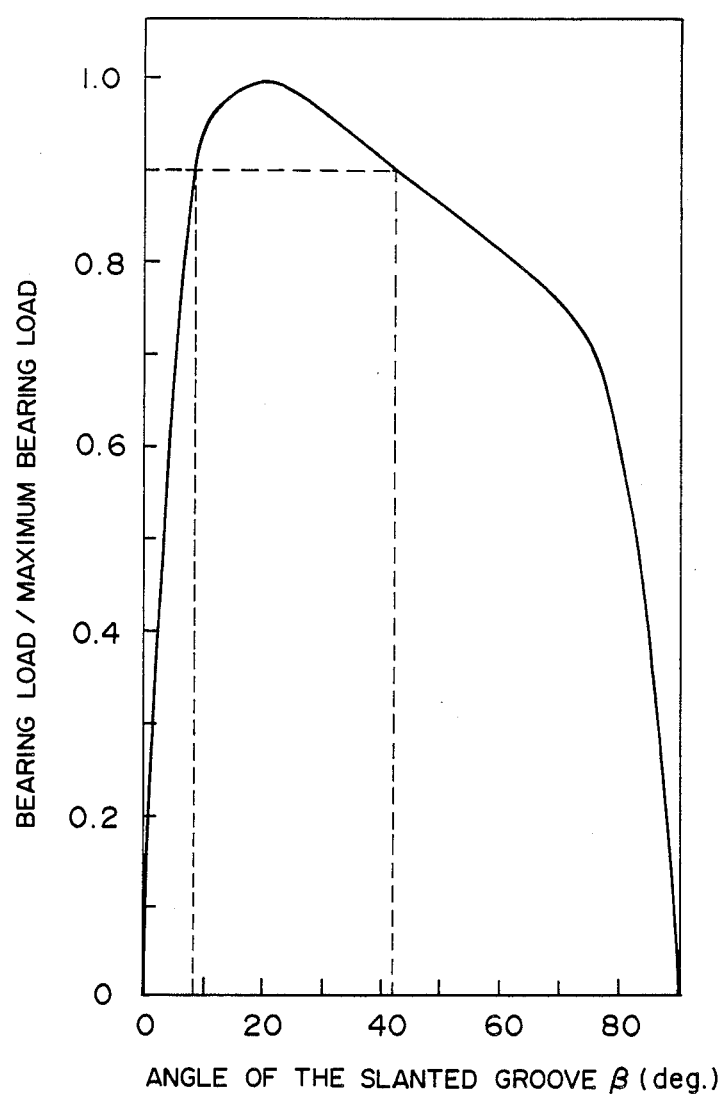
FIG. 12 is graph showing a change in the performance of a bearing in accordance with one of the embodiments of the present invention due to a change of the shape of each dynamic pressure generating groove provided therein.

The present invention has been mainly described with respect to the formation of the groove portion 16C, and it will now be described with respect to a change of the allowable bearing load on the basis of an angle of inclination of the two slanted groove portions 16A and 16B. FIG. 12 shows the relationship therebetween. In FIG. 12, the abscissa represents an angle $\beta$ of the slanted groove portion 16A or 16B relative to the direction of rotation, and the ordinate represents the bearing load (bearing load/maximum bearing load). As is understood from FIG. 12, there is an optimum value of the angle of inclination $\beta$, and the bearing load is more than 90% of the maximum bearing load when the angle $\beta$ is within a range of from 8° to 42°.

In the dynamic pressure generating groove, the width of each of the slanted grooves 16A and 16B may be equal to that of the accumulating groove 16C or may be different therefrom. It is possible to optimize the performance of the bearing for the system to which the bearing is adapted by providing a difference between the width of each of the grooves 16A and 16B and that of the groove 16C. The formation of the groove may be effected by etching, cutting, stamping, or any other means. For instance, portions other than those corresponding to the grooves may be raised so as to form the grooves by welding (padding), vapor deposition, or a similar method shown in FIG. 14.

Figure 13:
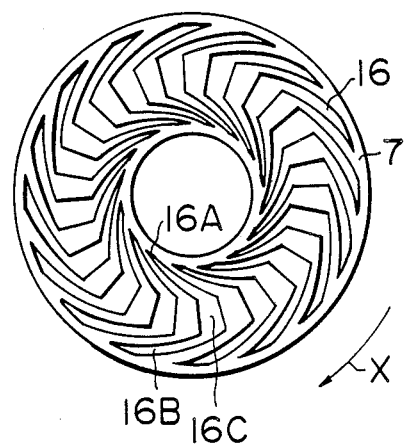
FIG. 13 is a diagram of still another embodiment of the present invention.

The invention has been mainly described with respect to the radial bearing, but the present invention is also applicable to thrust bearings. For example, in a thrust bearing such as one that is formed of the end surface 7 of the shaft 4 and the thrust bearing plate shown in FIG. 1, dynamic pressure generating grooves similar to those in the above-described embodiments may be formed in the end surface 7 or the plate 5. FIG. 13 shows an example of the shape of the grooves arranged in the direction of the rotation which is provided in such a thrust bearing. In this example, groups of grooves 16 for generating dynamic pressure are formed in the end surface 7 of the shaft 4. Each groove is constituted by two boosting slanted groove portions 16A and 16B and an accumulating groove portion 16C perpendicular to a direction of rotation X. This thrust bearing enables an allowable bearing load higher than that of the conventional V-groove bearing and realizes a stable bearing performance.

Figure 14:
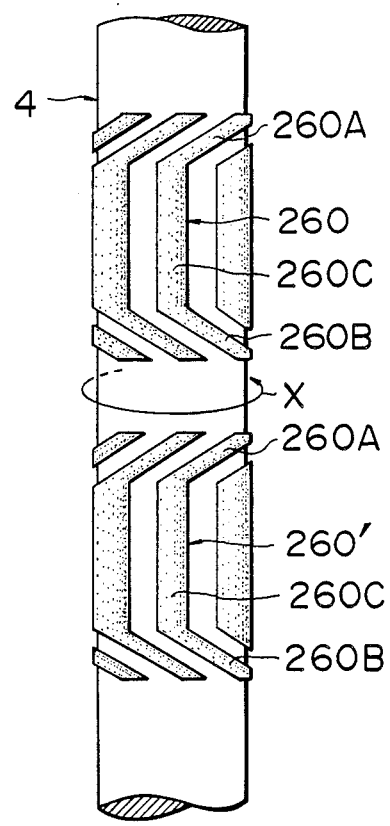
FIG. 14 is a diagram of a further embodiment of the present invention.

In the above description, means for generating dynamic pressure is exemplified by the grooves, but the present invention is not limited to this. As shown in FIG. 14, raised portions 260 and 260' each having the same shape as that of the grooves in the above embodiments may be formed in place of the grooves. In that case, the raised portions may be formed by any processing. method. Each of the raised portions is formed of two slanted portions 260A and 260B and a connecting raised portion 260C. Fluid is pressurized while flowing along the two slanted portions 260A and 260B and retained by the connecting raised portion 260C in an accumulating manner. Therefore, the raised portions has functions similar to those of the grooves and can achieve the same effect.

Further, the means for generating dynamic pressure may be only one groove and be only one group of the grooves although the embodiment shown in FIG. 2 includes two groups of the grooves disposed vertically.

What is claimed is:

1. A hydrodynamic grooved bearing device in which dynamic pressure generating grooves are formed on one of a rotary member and a stationary member facing said rotary member and fluid is provided between opposed surfaces of said rotary and stationary members, wherein each of said dynamic pressure generating grooves comprises a pair of groove portions oppositely slanted relative to a direction of rotation of said rotary member with the remotest ends of said pair toward the rotational direction and the nearest ends of said pair rearward of the rotational direction and a groove portion interconnecting said nearest ends of said pair in a direction substantially perpendicular to the rotational direction.

2. A hydrodynamic grooved bearing device according to claim 1, wherein a value of a ratio of a distance between the nearest ends of said pair of slanted groove portions to a distance between the remotest ends of said pair of slanted groove portions is determined in a range from 0.3 to 0.8.

3. A hydrodynamic grooved bearing device according to claim 1, wherein said fluid is liquid.

4. A hydrodynamic grooved bearing device according to claim 1, wherein said fluid is gas.

5. A hydrodynamic grooved bearing device according to claim 1, wherein said dynamic pressure generating grooves are arranged with a substantially certain pitch in the rotational direction.

6. A hydrodynamic grooved bearing device according to claim 1 or 5, wherein said dynamic pressure generating grooves are arranged in a plurality of groups, said groups being disposed in a direction perpendicular to the rotational direction.

7. A hydrodynamic grooved bearing device in which dynamic pressure generating grooves are formed on one of a rotary member and a stationary member facing said rotary member and fluid is provided between opposed surfaces of said rotary and stationary members, wherein each of said dynamic pressure generating grooves comprises a pair of boosting groove portions oppositely slanted relative to a direction of rotational movement of said rotary member with the remotest ends of said pair toward the rotational direction and the nearest ends of said pair rearward of the rotational direction and an accumulating groove portion interconnecting said nearest ends of said pair of boosting groove portions, said accumulating groove portion being formed so as to be perpendicular to the rotational direction.

8. A hydrodynamic grooved bearing device including a shaft member, a housing member into which said shaft member is fitted, fluid provided between said shaft member and said housing member and dynamic pressure generating grooves formed on one of a surface of said shaft member and a receiving surface of said housing member facing said surface of said shaft member, said surface of said shaft member including a peripheral surface and an end surface and said receiving surface of said housing member including a peripheral receiving surface and an end receiving surface, wherein each of said dynamic pressure generating grooves comprises a pair of slanted groove portions oppositely slanted relative to a direction of rotational movement of one of said shaft member and said housing member with the remotest ends of said pair toward the rotational direction and the nearest ends of said pair rearward of the rotational direction and a groove portion interconnecting said nearest ends in a direction substantially perpendicular to the rotational direction.

9. A hydrodynamic grooved bearing device according to claim 8, wherein a value of a ratio of a distance between the nearest ends of said pair to a distance between the remotest ends of said pair is determined in a range from 0.3 to 0.8.

10. A hydrodynamic grooved bearing device according to claim 8, wherein said fluid is liquid.

11. A hydrodynamic grooved bearing device according to claim 8, wherein said fluid is gas.

12. A hydrodynamic grooved bearing device according to claim 8, wherein said dynamic pressure generating grooves are formed on one of the end surface of said shaft member and the end receiving surface of said housing member facing said end surface of said shaft member.

13. A hydrodynamic grooved bearing device according to claim 8, wherein said shaft member is provided as a rotary member, and wherein said dynamic pressure generating grooves are formed on said surface of said shaft member.

14. A hydrodynamic grooved bearing device according to claim 8, wherein said shaft member is provided as a rotary member, and wherein said dynamic pressure generating grooves are formed on said receiving surface of said housing member.

15. A hydrodynamic grooved bearing device according to claim 8, wherein said housing member is provided as a rotary member, and wherein said dynamic pressure generating grooves are formed on said receiving surface of said housing member.

16. A hydrodynamic grooved bearing device according to claim 8, wherein said housing member is provided as a rotary member, and wherein said dynamic pressure generating grooves are formed on said surface of said shaft member.

17. A hydrodynamic grooved bearing device according to any one of claims 8 to 16, wherein said dynamic pressure generating grooves are arranged in the rotational direction with a substantially certain pitch.

18. A hydrodynamic grooved bearing device according to any one of claims 8 or 13-16, wherein said dynamic pressure generating grooves are arranged in a plurality of groups, said groups being disposed in a direction substantially perpendicular to the rotational direction.

19. A hydrodynamic bearing device in which two opposed surfaces are disposed so as to be close to each other and a lubricating substance is filled between said opposed surfaces, wherein a plurality of dynamic pressure generating grooves or raised portions are formed on one of said opposed surfaces, each of said dynamic pressure generating grooves or raised portions comprising a pair of slanted groove portions or slanted raised portions oppositely slanted relative to a direction of relative movement of said two surfaces with the remotest ends of said pair toward the direction of relative movement and the nearest ends of said pair rearward of the direction of relative movement and a groove portion or raised portion interconnecting said nearest ends is a direction substantially perpendicular to the direction of relative movement, wherein an area defined between adjacent pairs of grooves or raised portions is the area where the dynamic pressure is generated.

20. A hydrodynamic bearing device according to claim 19, wherein said plurality of dynamic pressure generating grooves or raised portions are arranged side by side with a substantially certain pitch in the direction of relative movement.

21. A hydrodynamic bearing device according to claim 19, wherein said plurality of dynamic pressure generating grooves or raised portions are arranged in a plurality of groups, said groups being disposed in a direction perpendicular to the direction of relative movement.

22. A hydrodynamic bearing device according to claim 19, wherein a value of a ratio of a distance between the nearest ends of said pair of slanted groove portions or slanted raised portions to a distance between said remotest ends of said pair of slanted groove portions or slanted raised portions is determined in a range from 0.3 to 0.8.

23. A hydrodynamic bearing device according to claim 19, wherein said lubricating substance is liquid lubricating substance.

24. A hydrodynamic bearing device according to claim 19, wherein said lubricating substance is gaseous lubricating substance.

25. A hydrodynamic bearing device having a rotary portion, a fixed portion for supporting said rotary portion and fluid filled between said rotary and fixed portions, wherein said device comprises a bearing portion having a plurality of grooves or raised portions arranged side by side in a direction of rotation and formed on said rotary portion, each of said plurality of grooves or raised portions comprising a pair of slanted grooves or slanted raised portions slanted such that a distance between said pair of grooves or raised portions becomes narrower rearward in the direction of rotation and a linear groove or linear raised portion extending in a direction perpendicular to the direction of rotation interconnecting between the narrowest ends of said pair of slanted grooves or raised portions, wherein an area defined between adjacent pairs of grooves or raised portions is the area where dynamic pressure is generated.

26. A hydrodynamic bearing device according to claim 25, wherein said bearing portion is formed on a radial surface of said rotary member.

27. A hydrodynamic bearing device according to claim 25, wherein said bearing portion is formed on a thrust surface of said rotary member.

28. A hydrodynamic bearing device according to claim 25, wherein a value of a distance between the narrowest ends of each of said pairs of slanted grooves or slanted raised portions to a distance between the widest ends of each of said pairs of slanted grooves or slanted raised portions is determined in a range from 0.3 to 0.8.

29. A hydrodynamic bearing device according to claim 25, wherein said fluid is a lubricating substance.

30. A hydrodynamic grooved bearing device used in an apparatus having a rotary portion with a magnetic head and a fixed portion for supporting said rotary portion on which a magnetic tape is wound so as to effect magnetic recording or reproducing, wherein dynamic pressure generating grooves are formed on one of opposed surfaces of said rotary portion and said fixed portion and fluid is filled between said opposed surfaces of said rotary portion and said fixed portion, each of said dynamic pressure generating grooves being constituted by a pair of slanted groove portions oppositely slanted relative to a direction of relative movement between said rotary portion and said fixed portion such that a distance between said pair of slanted groove portions becomes narrower rearward in the direction of relative movement and a connecting groove portion extending in a direction perpendicular to the direction of relative movement and interconnecting the narrowest ends of said pair of slanted groove portions.

* * * * *